United States Patent [19]  
Ihara et al.

[11] Patent Number: 4,861,626  
[45] Date of Patent: Aug. 29, 1989

[54] EXTRUSION DIE, METHOD OF PRODUCING THE SAME AND METHOD OF RECLAIMING THE SAME

[75] Inventors: Masahiro Ihara, Munakata; Kazuo Suzuki, Inazawa; Hideya Maekawa, Tokai; Haremi Ito, Tokoname; Kenichi Tanaka, Chita, all of Japan

[73] Assignee: NGK Insulators, Ltd., Nagoya, Japan

[21] Appl. No.: 141,258

[22] Filed: Jan. 6, 1988

Related U.S. Application Data

[63] Continuation-in-part of Ser. No. 874,631, Jun. 16, 1986, abandoned, which is a continuation-in-part of Ser. No. 397,227, Jul. 12, 1982, abandoned, which is a continuation of Ser. No. 231,784, Feb. 15, 1981, abandoned, which is a continuation of Ser. No. 71,290, Aug. 30, 1979, abandoned, which is a continuation of Ser. No. 653,479, Sep. 21, 1984, abandoned, which is a continuation of Ser. No. 520,221, Aug. 5, 1985, abandoned, which is a continuation of Ser. No. 388,267, Jun. 14, 1982, abandoned, which is a continuation of Ser. No. 239,605, Mar. 21, 1981, abandoned, which is a continuation of Ser. No. 70,644, Aug. 24, 1979, abandoned.

[30] Foreign Application Priority Data

Apr. 21, 1979 [JP] Japan .................. 54-49219  
Apr. 21, 1979 [JP] Japan .................. 54-49220  
Jan. 19, 1987 [JP] Japan .................. 62-8333

[51] Int. Cl.[4] .............................................. B29F 3/04
[52] U.S. Cl. ........................... 427/133; 427/135; 249/115; 249/114.1; 425/462; 425/463
[58] Field of Search .................. 425/461–465, 425/117; 249/115, 114 R; 427/133

[56] References Cited

U.S. PATENT DOCUMENTS 3,617,363 11/1971 Metzger ..................... 427/383.7

OTHER PUBLICATIONS

EP No. 0240265, 10/7/87.

Primary Examiner—Sam Silverberg  
Attorney, Agent, or Firm—Arnold, White & Durkee

[57] ABSTRACT

An extrusion die an be produced and reclaimed precisely, quickly and easily in an economical way, possesses a high abrasive-resistant property and a prolonged life, produces light-weight honeycomb structures having thin partition walls and provides a large reaction surface area within the honeycomb structure for the catalyst to contact with the exhaust gases, in addition to smooth passage of the exhaust gases with little pressure loss thereof, and mitigates or eliminates the drawbacks of conventional dies.

5 Claims, 3 Drawing Sheets

FIG_1

FIG_2

FIG. 5

EXTRUSION DIE, METHOD OF PRODUCING THE SAME AND METHOD OF RECLAIMING THE SAME

CROSS REFERENCE TO RELATED APPLICATION

This application is a continuation-in-part application of U.S. Ser. No. 874,631 filed 6/16/86 now abandoned, which is a continuation-in-part application of U.S. Ser. No. 397,227 filed 7/12/82 now abandoned, which is a continuation application of U.S. Ser. No. 231,784 filed 2/15/81, now abandoned, which is a continuation application of U.S. Ser. No. 71,290 filed 8/30/79, which is now abandoned.

This application is also a continuation-in-part application of U.S. Ser. No. 653,479 filed 9/21/84, now abandoned, which is a continuation application of U.S. Ser. No. 520,221 filed 8/5/85, now abandoned, which is a continuation application of U.S. Ser. No. 388,267 filed 6/14/82 now abandoned, which is a continuation application of U.S. Ser. No. 239,605 filed 3/21/81 now abandoned, which is a continuation application of U.S. Ser. No. 70,644, 8/28/79 which is now abandoned. This application also claims a priority of an original Japanese Patent Application No. 62-8,333 filed on Jan. 19, 1987.

BACKGROUND OF THE INVENTION

1. Field of the Invention

The present invention relates to a die for extruding a ceramic batch of raw materials of a ceramic honeycomb structural body, a method of producing the die, and a method of reclaiming the die.

2. Related Art Statement

A ceramic honeycomb structural body having a large number of parallel cells which are confined by relatively thin lattice like partition walls and extend therethrough in its axial direction, having an open frontal area of about 60-90% preferably 65-85%, and supporting a catalyst on the surface of the partition walls for removing harmful CO, NOx and HC from exhaust gases of automobile engines passing through the honeycomb structural body, is produced by extruding a ceramic batch of raw materials of the honeycomb structural body through a die to obtain a green honeycomb structural body, drying the green body, and firing the dried green body, as described in U.S. Pat. No. 3,824,196, for example.

Because the thus produced honeycomb structural body allows passages of exhaust gases that react with the supported catalyst, the honeycomb structural body must have a large reaction area and a low pressure loss for the exhaust gases passing therethrough. In order to increase the reaction area of a honeycomb structural body in a limited volume of a purifying apparatus for exhaust gas, preferably, the thickness of the partition walls is made as small as possible, while increasing the cell number per unit area of the honeycomb body. For increasing the cell number per unit area (the density of cells), if the dimension between the partition walls is solely decreased without decreasing the thickness of the partition walls, a large surface area for reaction with the exhaust gas can be obtain, but naturally the pressure loss of the exhaust gas becomes high to an untolerable extent, so that the use of such a honeycomb structural body is practically obstructed.

A honeycomb structural body having thin partition walls can be obtained by the use of an extrusion die having a small slit width. However, the slits of such an extrusion die have hitherto been produced by abrasion machining with the aid of a grinder, milling machining and an electric discharge machining, subjected to steel, so that the limit of the slit width, which is able to be formed by the above described machining with respect to slits having a given depth, is about 0.30 mm at the minimum.

The production of slits having a width smaller than 0.3 mm is very difficult due to the production accuracy of a grinder, a milling blade and a discharge electrode and due to the machining accuracy when the slits are formed by the use of these tools.

Japanese Examined Patent Application Publication No. 51-20,435 discloses that a honeycomb structural body having a round shape at the crossing corners of the partition walls causes the exhaust gas to flow smoothly and improves the reaction efficiency of the catalyst. This honeycomb structural body is produced by the use of an extrusion die having a round shape at the crossing corners of lattice-like slits, wherein the round shape is obtained by rounding off the crossing corners of the lattice-like slits by a cutting machining or electric discharge machining. However, the invention of the publication No. 51-20,435 has drawbacks in that even the formation of slits having a width of about 0.3 mm is difficult, and that after the slits having a width smaller than 0.3 mm are formed, it is extremely difficult to insert into the slits a cutting tool for rounding off the crossing corners of lattice-like slits of the die and to manufacture accurately a discharge electrode having small round portions.

As a result, a honeycomb structural body having partition walls of thickness of 0.3 mm or smaller than 0.3 mm or rounded crossing corners is difficult to obtain. Therefore, it is impossible to obtain a large catalytic reaction area and to cause the exhaust gas to flow smoothly. For example, when the honeycomb structural body is used as a catalyst carrier in the purification of exhaust gases of automobile engines, the honeycomb structural body is large in weight for use as a catalyst carrier and the catalyst requires a long time for a desired temperature increase at the starting period of the engine, and the exhaust gas can not be sufficiently purified during the starting period of the engine.

Even in precision machining the dimensional accuracy of slit widths always has a working error of about 10%. Thus, when it is intended to produce slits having a width of 0.3 mm for example, slits having a width of about 0.27-0.33 mm are obtained. When this tolerance is not accepted in practice, the extrusion dies have to be discarded. Further, when a slit having a width of 0.33 mm is obtained, and the upper limit of the slit width is 0.35 mm, only a very small number of honeycomb structural bodies can be extruded until the width 0.33 mm of the slits becomes 0.35 mm due to the wear of the slits.

Though it has been described in U.S. Pat. No. 3,930,522, column 6, lines 56-58, and U.S. Pat. No. 4,021,134, column 5, lines 46-50, that a die for extruding a honeycomb structural body is subjected to electroless nickel plating, these U.S. Patents only aim to prevent rusting of the die and to decrease the friction coefficient between the die and the ceramic batch, and neither discloses nor teaches the technical features and an effect of the present invention of controlling the slit width by controlling the thickness of the plating metal film, thereby to form slits having a width smaller than the width of slits formed by any conventional methods in a very simple way, and other distinguished effects attained in the present invention.

Further, even if a slit having a desired width has been obtained by electroless nickel plating, the plated nickel film is very poor in the abrasion resistance against the ceramic batch. The inventors have found out that, even when the slits having a nickel film plated thereon are heat treated at a temperature of 600°–700° C., which heat treatment temperature has hitherto been believed to be effective for improving the abrasion resistance of plated nickel film to the ceramic batch, the heat treatment is not effective at all for the improvement of abrasion resistance of the nickel film to the ceramic batch, and that hence the slits are worn by extrusions of a small amount of the ceramic batches, and as a result the slit width becomes larger than the specified width, and the die can not be used for the production of the honeycomb structural bodies and must be discarded. Of course, a nickel film having a thickness of about 0.01–0.05 mm, which is usually used for the purposes of preventing the rusting and lowering the friction coefficient, is worn and lost rapidly due to the abrasion by the ceramic batch so that it can not attain the above described purposes at all.

The life of dies can be prolonged by improvements of the abrasion-resistant property of the plated layer on the slits, and the abrasive-resistant property of the plated layer can be improved to some extent by varying the type of a reducing agent and subjecting the plated layer to a heat treatment. However, such improvements have been naturally limited, because the plating layer is composed mainly of nickel.

A method of improving the abrasive-resistant property of the electroless plating layer has been disclosed by Japanese Examined Patent Application Publication No. 47-24,857, wherein a composite plating layer composed of a plating layer and abrasive-resistant particles dispersed in the plating layer is applied on the surface of an article to be plated from an electroless plating solution containing dispersed abrasive-resistant particles.

However, when the above method is applied to dies for providing the composite plating layer, the following drawbacks are encountered, though the demand of high abrasive-resistant property can be satisfied.

Firstly, the reclaiming of such a composite plating layer was heretofore impossible in the technical field of the die, because of its poor solubility in a removing solution.

Secondly, if the plating layer on the slits of the die is constituted solely from a composite plating layer composed of a metal substrate and abrasive-resistant particles of such as silicon carbide, tungsten carbide or the like dispersed in the metal substrate, the plating layer has to be removed totally and the electroless composite plating has to be started from the beginning, when the plating layer of the die has to be reclaimed after the plating layer is worn by the abrasion of the ceramic batch. In this case, there are drawbacks in that the abrasive-resistant particles adhere firmly on the surface of the slits etc., so that a means has to be adopted of removing the adhered particles by high pressurized water, and that forcible removal of the particles leaves scars on the slits and/or the metal matrix of the die.

Thirdly, the electroless composite plating has a drawback of low deposition rate and requiring a deposition time of about 2-3 times of that of an electroless plating and a drawback of further necessitating a long deposition time when the slits surfaces are ground due to the repetition of reclaiming of the slits and an increased amount of electroless plating has to be effected on the ground surface of the slits.

Fourthly, if the electroless composite abrasive-resistant plating layer is directly deposited on the slits surface of the die, the amount of the electroless composite abrasive-resistant plating layer deposited on the corner portions of the matrix at the cross-section of the slits is smaller than that deposited on the other portion of the matrix, and therefore the surface of the deposited plating layer assumes a rough surface. Thus, a drawback occurs in that a uniform slit width is difficult to obtain. This is presumably due to a reason that the composite abrasive-resistant plating layer has a poor uniform deposition property as compared to the usual electroless plating layer, because the layer contains the abrasive-resistant particles uniformly distributed therein and the plating layer is easily influenced by the underlying matrix surface.

Fifthly, the outer configuration of the green honeycomb structural body shaped from the ceramic batch should be circular, elliptical or long elliptical shape in cross-section depending on the demands. In these cases, a mask plate having an opening corresponding to the shape of the green honeycomb structural body to be extruded has to be attached in front of the extruding die. If the mask plate closes a portion of the slits at the peripheral portion of the die depending on the shape of the opening of the mask plate, the closed portion of the slits at the peripheral portion of the die does not permit the ceramic batch to be extruded therethrough, so that the slits at the closed portion are not worn. Therefore, if the mask plate is exchanged to another mask plate having a different opening and used for extrusion of a ceramic batch, the resultant green honeycomb structural body has different thicknesses of the partition walls at the peripheral portion of the die from the thickness of the other portions of the die. Thus, it is extremely difficult to produce many green honeycomb structural bodies of various shapes in cross-section with an appropriate and uniform thickness of the partition walls by the use of a single die. Even if the wear of the slits of the die is small when the mask plates of various openings are used, reclaiming of the slits was heretofore impossible, so that the die has to be discarded in vain without reusing the valuable source material die.

SUMMARY OF THE INVENTION

An object of the present invention is to obviate the above drawbacks.

Another object of the present invention is to provide a novel die which can produce ceramic honeycomb structural bodies which are used as catalyst carriers which afford smooth passage of the exhaust gases as well as large reactive surface area of the catalyst to the exhaust gases.

A further object of the present invention is to provide a method of producing the novel die simply in a short period of time.

A still further object of the present invention is to provide a method of reclaiming the die in a simple and economical way.

The present invention is a die for extruding a ceramic batch of raw materials of a ceramic honeycomb structural body, which has a metallic matrix having lattice-like slits of a desired width for defining a thickness of cell walls of the honeycomb structural body and a plurality of independent inlet holes in communication with the slits for introducing the ceramic batch into the slits from a feed, comprising, a composite plating film of a double layered structure composed of a composite abrasive-resistant plating layer and a metallic plating layer arranged on the matrix at at least the surface of the slits for defining the width of the slits to the desired width, the metallic plating layer being a metal formed on the matrix at at least the surface of the slits, and the composite abrasive-resistant plating layer being made of at least one metal and at least one type of abrasive-resistant particles dispersed in the metal and arranged on the metallic layer.

In a preferred embodiment of the present invention, the metallic plating layer is nickel, and the composite abrasive-resistant plating layer is made of a nickel substrate and abrasive-resistant particles of silicon carbide dispersed in the nickel substrate.

In another aspect of the present invention is a method of producing a die for extruding a ceramic batch of raw materials of a ceramic honeycomb structural body, which has lattice-like slits of a desired width i' for defining a thickness of the cell walls of the honeycomb structural body and a plurality of independent inlet holes in communication with the slits for introducing the batch into the slits from a feed, which comprises the steps of forming the lattice-like slits of a slit width larger than the desired width of the slits on the front surface of the die by machining, forming the plurality of the inlet holes on the rear side of a matrix of the die, measuring a width of the slits to obtain a measured slits width i, and providing a composite plating film of a double layered structure composed of a metallic plating layer and a composite abrasive-resistant plating layer of a thickness of one half of the difference between the measured slit width i and the desired slit width i', i.e., (i−i')/2 on at least the surface of the slits by electroless plating to form the desired slit width i', the metallic plating layer being formed by electroless plating of a metal on the matrix at at least the surface of the slits, and the composite abrasive-resistant plating layer being formed of at least one metal and at least one kind of abrasive-resistant particles dispersed in the metal and arranged on the metallic plating layer by electroless plating.

In a preferred embodiment of the method of the present invention, the metallic plating layer is nickel, and the composite abrasive-resistant plating layer is made of a nickel substrate and abrasive-resistant particles of silicon carbide dispersed in the nickel substrate.

In another aspect of the present invention, the present invention is a method of reclaiming a die for extruding a ceramic batch of raw materials of a ceramic honeycomb structural body, which has lattice-like slits of a desired width for defining a thickness of the cell walls of the honeycomb structural body, a plurality of independent inlet holes in communication with the slits for introducing the batch into the slits from a feed, a double layered structure composed of a composite abrasive-resistant plating layer and a metallic plating layer and arranged on at least the surface of the slits for defining the width of the slits to the desired width, the metallic plating layer being formed by electroless plating of a metal on the matrix at at least the surface of the slits, and the composite abrasive-resistant plating layer being made of at least one metal and at least one kind of abrasive-resistant plating particles dispersed in the metal arranged on the metallic plating layer. When the composite abrasive-resistant plating layer of the slits of the die become worn by an abrasive action of the batch to beyond a tolerable range of the desired width of the slits, the die can be reclaimed by a method comprising the steps of, dissolving and removing the remaining double layered structure chemically, and again providing the composite plating layer of the double layered structure on the matrix at at least the surface of the slits by electroless plating to form the desired width of the slits.

Throughout different views of the drawings, numberings of referential numerals indicate the followings.

1 . . . extrusion die
2 . . . matrix of the die
3 . . . orifice portion or front side of the die
4 . . . unit area of the orifice portion 3
5 . . . slit of the die 1
7 . . . inlet hole for introducing a ceramic batch
8 . . . composite plating film or layer
9 . . . electroless plating layer
10 . . . composite abrasive-resistant plating layer
11 . . . mask plate
12 . . . round corner of the unit area 4 of the orifice portion 3 after plating
a . . . diameter of the matrix 2
b . . . height of the matrix 2
c . . . diameter of the orifice portion 3
d . . . length of the inlet holes 7 portion
e . . . length of the orifice portion 3
i . . . measured width of slit
i' . . . desired width of slit
p . . . pitch of the slits 5 and the inlet holes 7
t . . . thickness of the composite plating film 8

DETAILED DESCRIPTION OF THE INVENTION

Hereinafter, the present invention will be explained in more detail with reference to the accompanying drawings.

Referring to FIGS. 1 to 5, an extrusion die 1 is produced by the present method, wherein lattice-like slits 5 are formed uniformly in the front side or the orifice portion 3 of the matrix 2 of the die 1 by a conventional treatment of machining or electric discharge treatment, and a plurality of inlet holes 7 of a circular shape in cross-section and corresponding to the slits 5 and in alignment of their axes with the axes of the slits 5 are bored from the rear side or the interior of the matrix 2 so as to communicate the inlet holes 7 with the slits 5 for enabling the ceramic batch to be introduced into the slits 5 through the inlet holes 7 from a feed source not shown.

Figure 1:
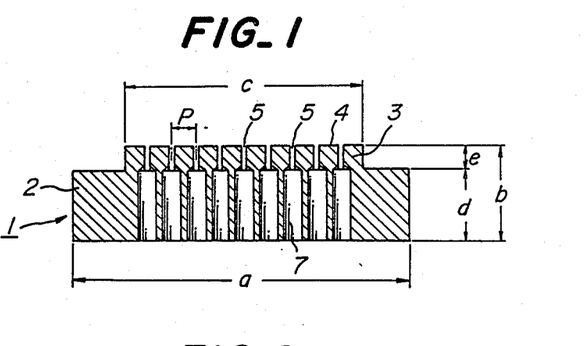
FIG. 1 is a vertical sectional view of a matrix of an extrusion die of the present invention.
Figure 2:
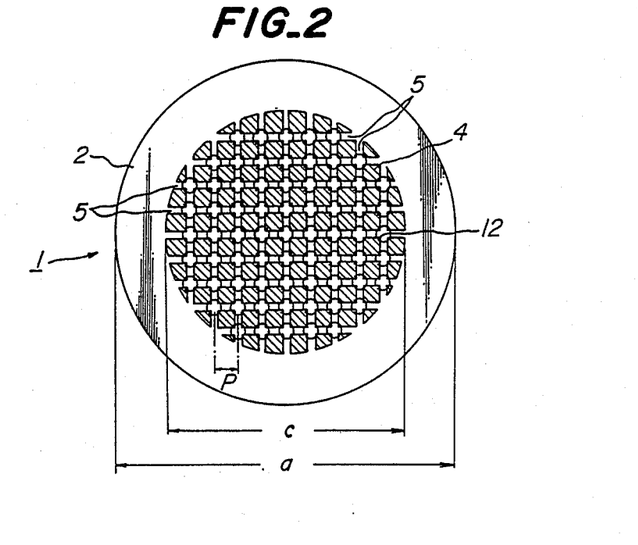
FIG. 2 is a plan view of the matrix of the die shown in FIG. 1.

The slits 5 on the front side 3 of the matrix 2 of the die are measured on their width by a measuring means such as an optical image projector to obtain a measured width i. The measured width i of the slits 5 should be a little larger than a desired width i' of plated slits 5, so that the formation of the slits 5 should be effected to obtain such width i on measurement.

Figure 4:
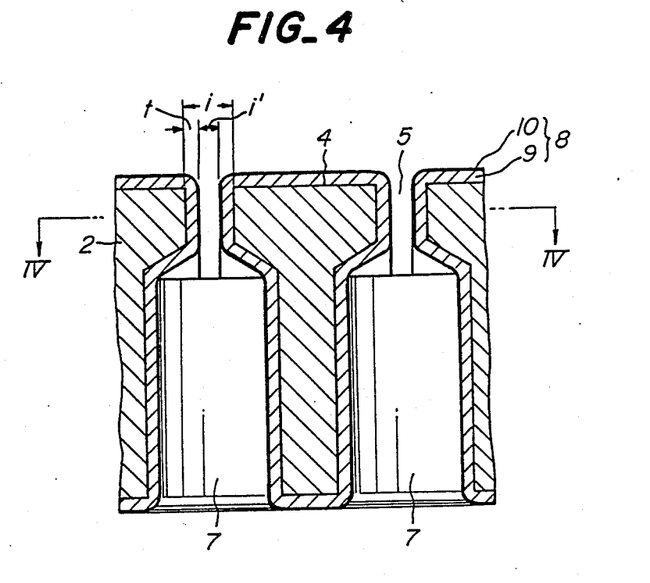
FIG. 4 is an enlarged vertical sectional view of a part of an extrusion die of the present invention.
Figure 5:
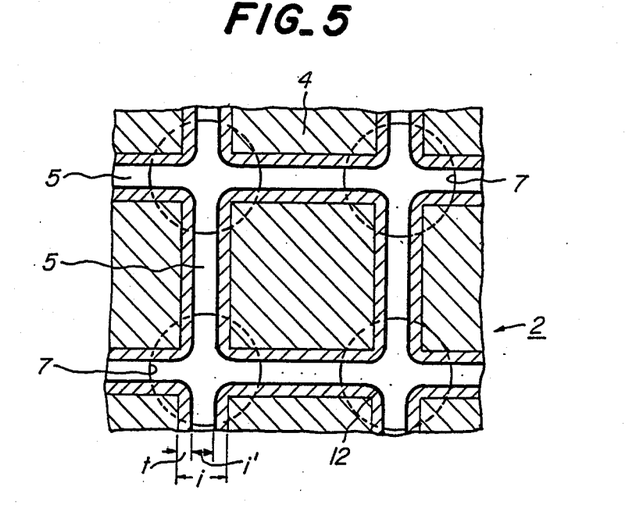
FIG. 5 is an enlarged horizontal sectional view of the die shown in FIG. 4 taken along the line IV—IV in FIG. 4.

A composite plating film or layer 8 of a thickness t of one half of the difference between the measured width i and the desired width i', i.e., (i−i')/2, is applied on the surface of the slits 5 or further on he surface of the inlet holes 7 in addition to the surface of the slits 5. The composite plating film 8 is composed of an electroless plating layer 9 and a composite abrasive-resistant plating layer 10 constituted from at least one metal and at least one type of abrasive-resistant particles such as silicon carbide, tungsten carbide and the like dispersed in the metal.

Each thickness of the electroless plating layer 9 and the composite abrasive-resistant plating layer 10 can be easily adjusted respectively to a desired thickness in a highly precisely adjusted plating solution for a period of selected time determined based on a preliminarily prepared correlation curve of thicknesses of the plating film relative to plating periods. Therefore, a desired thickness t of the plating film 8 can be obtained easily.

Alternatively, a desired thickness t of the plating film 8 can be obtained by another method of immersing the matrix and the test piece made of the same material with the matrix in an electroless plating solution, taking out the test piece a few times occasionally with the elapse of the immersion time from the electroless plating solution to measure the thickness of the plating film formed on the test piece, stopping the plating film reached to a desired thickness, then immersing the plated test piece and the matrix having the desired thickness of the electroless plating layer thereon are immersed in a plating solution containing at least one kind of metal particles and at least one kind of abrasive-resistant particles both dispersed in an electroless plating solution, and forming a composite abrasive-resistant plating layer of a desired thickness t in the similar manners as in the formation of the electroless plating layer.

According to the above methods, at first an electroless plating layer of at least one kind of metal which has a fast deposition rate is provided on the surface of the slits 5 or on the surface of the inlet holes 7 in addition to the surface of the slits 5, and then an electroless composite plating layer 8 constituted from a metal substrate and abrasive-resistant particles dispersed in the metal substrate is provided on the electroless plating layer, to obtain the double layered structure composed of the electroless plating layer and the abrasive-resistant plating layer, which adjusts the width of the slits to a desired width. Therefore, the methods of the present invention can adjust or prepare the width of the slits to a desired width in a very short period of time as compared with the long time required when forming the whole plating layer solely from the composite abrasive-resistant plating layer.

In addition, the composite plating layer produced by the method of the present invention can exhibit a very high abrasive-resistant property, because the side of the composite plating layer facing to the abrasive ceramic batch is made of the composite abrasive-resistant plating layer. Because the side of the composite plating layer joining to the surface of the slits 5 or the surface of the slits 5 and the surface of the inlet holes 7, is made of an electroless plating layer of a metal, the adhesion of the abrasiveresistant particles such as silicon carbide, tungsten carbide, etc., to the matrix surface in case of removing the composite plating layer from the die when the composite plating layer became worn by the abrasion of the ceramic batch, can be prevented effectively.

Furthermore, because the electroless plating layer for constituting the composite plating layer has a good uniform deposition property, it forms a smooth deposition layer on the rough surface of the matrix even at the cross-sections of the slits, which is similarly uniform to the layers formed on the other portions of the matrix. Therefore, the composite abrasive-resistant plating layer can be deposited on the smooth and uniform surface of the electroless plating layer. Thus, the resultant composite plating layer assumes a smooth and uniform deposition layer as a whole, so that a die having slits of a smooth and uniform slit width throughout the slits can be obtained.

Preferably, the composite plating layer is composed of an electroless plating layer of nickel and a composite abrasive-resistant plating layer made of a nickel substrate and abrasive-resistant particles such as silicon carbide etc. in the nickel substrate, because the adhesions between the layers are good and the abrasive-resistant particles exhibit a good wear-resistant property in such case.

Preferably, the thickness of the composite abrasive-resistant plating layer is made such that it corresponds to an abrasion amount of the composite plating layer of the die due to the extrusions of the ceramic batch through the slits of the extrusion die, because the composite plating layer of the double layered structure can be produced in the minimum production time and the surface of the slits can always have the composite plating layer until the reclaiming of the composite plating layer.

The baths for the electroless plating and the electroless composite plating are composed mainly of metal nickel ions and a reducing agent. As the reducing agent, use is made of hypophosphite such as $NaPH_2O_2$ or $KPH_2O_2$ etc., or boron hydride salts such as sodium borohydride $NaBH_4$. Preferably, sodium hypophosphite is used for enhancing the high abrasion resistance of the composite plating film 8 of the double layered structure against the extrusion of the ceramic batch. Thus, a highly abrasion-resistant deposition layer can be obtained by depositing a nickel-phosphorus alloy film of a composition of 91–92% of Ni and 8–9% of P from the bath containing mainly the metal nickel ions and sodium hypophosphite as the reducing agent, and subjecting the alloy film to a heat treatment of 400°–500° C.

The extrusion die 1 produced in this way has the matrix 2, the orifice portion or the front-side 3 of the matrix 2, the unit area 4 of the orifice portion 3, and the lattice-like slits 5 bored in the orifice portion 3. The lattice-like slits 5 have the film of the composite plating layer 8 of the double layered structure of the thickness t of (i−i')/2 to form the desired width i' of the slits, the i being a measured width between the slits, the i' being the desired width between the slits. The plated slits 5 have the composite plating layer 8 of a uniform thickness t formed by the electroless platings and communicated with the inlet holes 7 arranged at the interior of the matrix 2 for introducing the ceramic batch, so that the ceramic batch introduced in the inlet holes 7 an be extruded through the plated slits 5 into the appropriately shaped green honeycomb structural body having the partition walls of a desired thickness, which partition walls define the cells of the honeycomb structural body.

The plated slits 5 of the desired slits width i' are obtained through the formation of the composite plating layer 8 and not by a direct machining, so that the plated slits 5 can easily have a slits width of 0.3 mm or less. Thus, the green honeycomb structural body formed by extrusion of the ceramic batch through the plated slit 5 of the extrusion die can have the partition walls of a thickness of 0.3 mm or less, and a catalyst carrier produced by firing the green honeycomb structural body can similarly have extremely thin partition walls. Therefore, when the catalyst carrier is used as a catalyst carrier for purifying exhaust gases from automobile engine, the catalyst carrier is lightweight and can function rapidly for the purification of the exhaust gases at the start-up period of automobile engines.

A die 1 having the composite plating layer 8 of rounded corners 12 of the unit area 4 of the orifice 3, which rounded corners 12 being formed at the crossing points of the slits 5 of the matrix 2, is used as the die 1 for extruding the ceramic batch, hence a catalyst carrier produced has cells of rounded corners and not of the right angled corners, so that the produced catalyst carrier can allow a smooth passage of exhaust gases therethrough and afford a large effective surface of a catalyst supported thereon for the contact with the exhaust gases.

If the slits 5 before the plating of the composite plating layer 8 have some dimensional error in width, such dimensional error in width can be corrected to a correct slits width i' by the above-described adjustments of the slits width during the electroless plating of the composite plating layer 8, so that there arise no vainness of dies being judged as inappropriate and discarded for the sake of their having the incorrect slits width.

Figure 3:
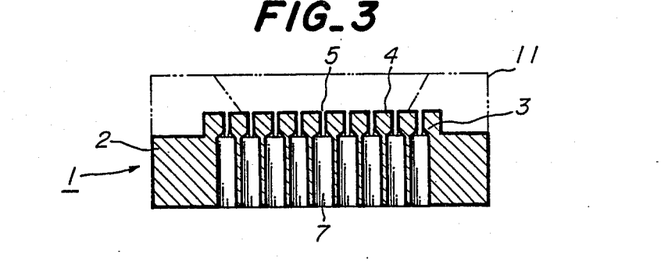
FIG. 3 is a vertical sectional view of a matrix of an extrusion die of the present invention.

If a mask plate 11 having a circular opening is attached on the front surface 3 of the die 1 having the slits 5 plated by the composite plating film 8 of the double layered structure and the ceramic batch is continuously fed in a usual manner from a source (not shown) into the inlet holes 7 of the die 1 and extruded from the plated slits 5, a green honeycomb structural body of a long length can be obtained which can be severed to a desired length at a desired position depending on its use.

Though all the slits 5 of the extrusion die 1 have a uniform desired width by virtue of the composite plating layer 8 formed on the slits by plating and the green honeycomb structural body extruded from the die 1 has the partition walls of a uniform thickness and is suited to the production of the catalyst carrier, the die 1 cannot be used further if the slits 5 of the die 1 are worn at the composite plating layer 8 to a slit width beyond a tolerable range of the desired slit width by the abrasion of the ceramic batch. Therefore, before the composite plating layer 8 is worn to expose the slits 5, it is separated or disengaged from them ask plate 11, and immersed in a nickel-dissolving solution such as an aqueous solution of nitric acid to dissolve and remove the remaining worn composite plating layer 8 on the slits 5 in a chemical manner, thereby to obtain the matrix 2h having the slits 5 with their original form and slits width. After the removal of the remaining composite layer 8, the composite plating layer 8 can be provided again on at least the surface of the slits 5 by forming the electroless plating layer 9 on at least the surface of the slits 5 and forming the composite abrasive-resistant plating layer 10 on the plating layer 9 by electroless plating. In this way, the layer adjacent to the surface of the matrix of the die 1 is made of an electroless plating layer 9, so that the adhesion of the abrasive-resistant particles such as silicon carbide, etc. on the surface of the slits 5 and other surface of the matrix 2 can be prevented in case of dissolving and removing the worn composite plating layer 8. Therefore, the conventional cumbersome operation of removing the adhered abrasive-resistant particles from the matrix 2 by means of a high pressure water and other forcible operations which leave scars or damages on the matrix 2 can be dispensed with.

DETAILED DESCRIPTION OF THE PREFERRED EMBODIMENTS

Hereinafter, the present invention will be explained in more detail with reference to preferred embodiments.

EXAMPLE 1

A steel material is processed by grinding to obtain a processed article having a diameter a of 120 mm, a length b of 40 mm, a diameter c of the orifice portion 3 of 60 mm, a length d of the inlet holes portion of 35 mm, and a length e of the orifice portion 3 of 5 mm. The processed steel material is drilled to form the inlet holes 7 of a diameter of 2 mm and a depth of 35 mm at a pitch p of the slits 5 and the inlet holes 7 of 3 mm, and further subjected to an electric discharge treatment to form the slits 5 under the purpose of obtaining target values of a slit width i of 0.32 mm, a slit depth of 5 mm and a pitch p of 3 mm, to attain the matrix 2 of the extrusion die.

A slit width i of the slits 5 of the matrix 2 is measured by an optical image projector to obtain a value of 0.33 mm. The desired slit width is selected as 0.15 mm. Therefore, the composite plating layer 8 of a thickness t of (0.33 mm − 0.15 mm) ÷ 2 = 0.09 mm is applied on the surface of the slits 5 and the surface of the inlet holes 7 to obtain the desired slits width of 0.15 mm by forming a nickel plating layer 9 of a thickness of 0.075 mm on the aforementioned surfaces by means of an electroless plating which has a fast deposition rate of 11 microns per hour, and forming a composite abrasive-resistant plating layer 10 constituted from a nickel plating substrate layer and silicon carbide particles a abrasive-resistant particles dispersed in the nickel plating layer by means of an electroless plating which has a slow deposition rate of 5 microns per hour. The thickness of the electroless nickel plating layer 9 and the composite abrasive-resistant plating layer 10 are controlled by correlating curves of plating hours and plating layer thicknesses both prepared prior to the platings.

Thereafter, the die 1 having the plated matrix 2 is heated to 450° C. at a temperature-raising rate of 450° C./hr, held at 450° C. for 1 hour, and cooled in air, to obtain an extrusion die 1 of the desired slits width of 0.15 mm.

Therefore, the time of about 10 hours required for forming the plating films of the total thickness of 0.09 mm is considerably shortened as compared with the time of 18 hours required for solely forming the composite abrasive-resistant plating layer.

The thus produced die, and a die produced by depositing solely an electroless plating nickel layer of a thickness of 0.090 mm on the matrix of the die, heating the plated die to 450° C. at a temperature-raising rate of 450° C./hr, holding at 450° C. for 3 hrs., and cooling in air, are used in extruding the ceramic honeycomb structural bodies for comparison. After the extrusion of the honeycomb structural bodies of a length of 1,500 m, the extent of the wear of the slits of the dies are respectively measured. The wear of the former die produced by the present method is only 0.010 mm, while the wear of the latter die has a value of 0.021 mm, which is twice as large.

Catalyst carriers produced using this extrusion die are lightweight, decreased by about 35%, and possess a small heat content, therefore resulting in increased fuel efficiency for automobile engines, relative to catalyst carriers of the same purifying property produced by conventional methods. The composite plating layer 8 formed by the above-mentioned electroless plating etc. forms rounded corners 12 of the unit area 4 of the orifice portion 3 at the crossing points of the slits 5, so that the catalyst carriers produced using this extrusion die 1 can provide smooth passages of the exhaust gases and a greater effective surface area of the catalyst supported on the catalyst carriers.

EXAMPLE 2

Five matrices 2 are produced in the same manner as in Example 1 with a target value of a slit width i of 0.3 mm, and the slit width of the produced matrices are measured. The desired slits i' width is selected as 0.15 mm. A necessary thickness t' of the composite plating layer 8 for obtaining the desired value of the slit width i' of 0.15 mm is determined on each of the matrices. Thus, t'=½ (measured slits width-0.15 (=i')) mm.

For applying the composite abrasive resistant plating layer 10 of a thickness of 0.15 mm among the thickness t' of the composite plating layer 8 on the surfaces of the slits 5, a nickel plating layer 9 of a thickness of 5'-0.015 mm is applied on the surfaces of the matrices by an electroless plating. Then, the composite abrasive-resistant plating layer 10 of the thickness of 0.015 mm is applied on the electroless nickel plating layer 9 by an electroless plating.

The results are shown in the following Table 1.

TABLE 1

| Sample No. | Measured slit width (target i is 0.3) (mm) | Necessary thickness t' (mm) | Thickness t of composite plating layer 8 (mm) | Obtained slit width (desired i' is 0.15) (mm) |
|---|---|---|---|---|
| 1 | 0.306 | 0.078 | 0.077 | 0.152 |
| 2 | 0.281 | 0.0655 | 0.067 | 0.147 |
| 3 | 0.314 | 0.082 | 0.081 | 0.152 |
| 4 | 0.327 | 0.0885 | 0.090 | 0.147 |
| 5 | 0.293 | 0.0715 | 0.072 | 0.149 |

As seen from the above Table 1, it is clear that the five matrices 2 after plated according to the present invention have less variations of the slits width relative to the variations of the slits widths of the matrices before the platings.

EXAMPLE 3

In the same manner as described in Example 1, a steel matrix 2 having a slit width of 0.324 mm on the orifice portion 3 is plated with an electroless plating layer 9 of a thickness of 0.072 mm, and the composite abrasive-resistant plating layer 10 constituted from a nickel substrate layer and silicon carbide particles dispersed in the nickel substrate layer of a thickness of 0.015 mm is applied on the electroless nickel plating layer 9 to obtain an extrusion die 1 of a slit width of 0.15 mm. The die 1 is used for producing the ceramic honeycomb structural bodies.

When the composite plating layer 8 is worn to the slit width of 0.172 mm which is beyond a tolerable range of the desired slits width of 0.15 mm, the die 1 is immersed in a 65% aqueous solution of nitric acid for about 3 hours to chemically dissolve and remove the whole remaining composite plating layer 8 from the matrix 2, and the matrix 2 is rinsed with water.

Then, the extrusion die is reclaimed to have the slit width of 0.15 mm by again forming the composite plating layer 8 on the matrix 2 in the same manner of plating as described above.

EXAMPLE 4

In the same manner as in Example 3, an extrusion die 1 of a slits width of 0.15 mm is produced. A mask plate 11 having an opening of a diameter of 100 mm is attached on the orifice portion 3 of the die 1, and the die 1 with the mask plate 11 is used for extruding the ceramic batch into green honeycomb structural bodies until the composite plating layer 8 on the slits 5 is worn to a slits width of 0.163 mm by the abrasive action of the ceramic batch.

Then, the mask plate 11 is replaced by another mask plate having a larger opening of a diameter of 200 mm than the former one, and the extrusion operation is started again using the extrusion die 1 with the new mask plate 11 to find out that proper green honeycomb structural bodies can not be obtained, because the slits 5 which are used for the first time after the renewal of the mask plate 11 has an unworn slits width of 0.15 mm while the slits 5 which are worn to the slits width of 0.163 mm have different slits width from each other and different amounts of the ceramic batch are extruded from the slits of different slits widths at different extrusion rates, so that such die 1 can not produce appropriate green honeycomb structural bodies any more.

Therefore, the extrusion die 1 after disengagement of the new mask plate 11 is immersed in a 65% aqueous solution of nitric acid for about 3.5 hours to dissolve and chemically remove the whole remaining composite plating layer 8, rinsed in water, and reclaimed to obtain the die 1 of the desired slit width of 0.15 mm by forming the composite plating layer 8 again on the matrix 2.

REFERENTIAL EXAMPLE

On the slits of the matrix of the die similar to that described in Example 1, is deposited solely the same composite abrasive-resistant plating layer as that described in Example 1 for a target thickness of 0.050 mm to obtain a referential die. Five sample pieces are taken out from the referential die and observed under an optical microscope to measure the thicknesses of the plating layer deposited on the slits. The thicknesses of the plating layer on the wall surface of the slits are 0.047–0.052 mm, while they are 0–0.015 mm at the cross-sections of the slits.

As described in detail in the foregoing, the present invention can exhibit many advantages. Namely, the extrusion die 1 can be produced and reclaimed precisely, quickly and easily in an economical way, is capable of producing honeycomb structures having thin partition walls, possesses high abrasive-resistant property and a prolonged life, provides a large reaction surface area for catalyst to contact with the exhaust gases as well as a smooth passage of the exhaust gases with little pressure loss thereof, and mitigates or eliminates the drawbacks of conventional dies. Therefore, the present invention is eminently useful industrially.

Although the present invention has been described with reference to specific embodiments and numerical values, it is of course apparent to those skilled in the art that various modifications and variations thereof are possible without departing from the broad spirits and aspects of the present invention as defined in the appended claims.

What is claimed is:

1. A die for extruding a ceramic honeycomb structural body from a ceramic batch of raw materials, said die comprising a metallic matrix having latticelike slits, said slits having a desired width for defining a thickness of a plurality of cell walls of said honeycomb structural body and a plurality of independent inlet holes in communication with said slits for introducing said batch into said slits from a supply of said batch, said matrix comprising a composite plating film of a double layered structure formed on at least the surface of the slits, such that said structure defines said desired width, said structure consisting essentially of a metallic plating layer formed on at least the surface of the slits and a composite abrasive-resistant plating layer formed on said metallic plating layer, said composite abrasive-resistant plating layer comprising at least one metal and at least one type of abrasive-resistant particles dispersed in the metal.

2. A die as defined in claim 1, wherein the metallic plating layer comprises nickel, and the composite abrasive-resistant plating layer comprises a nickel substrate and abrasive-resistant particles consisting essentially of silicon carbide dispersed therein.

3. A method of producing a die for extruding a ceramic honeycomb structural body from a ceramic batch of raw materials, said die having lattice-like slits of a desired width for defining a thickness of cell walls of the honeycomb structural body and a plurality of independent inlet holes in communication with the slits for introducing said batch into said slits from a supply of said batch, said method comprising the steps of, forming the lattice-like slits on the front surface of the die by machining, such that said lattice-like slits have a slit width larger than said desired width, forming the plurality of inlet holes on the rear side of the die such that said holes communicate with said slits, measuring a width of said slits to obtain a measured slit width, and providing a composite plating film on at least the surface of the slits by plating, said film being plated on said surface to a thickness substantially equal to one half of the difference between the measured slit width and the desired slit width, said plating film comprising a doubled layered structure consisting essentially of a metallic plating layer and a composite abrasive-resistant plating layer, said metallic plating layer being formed by electroless plating a metal on at least the surface of the slits, and said composite abrasive-resistant plating layer being formed of at least one metal and at least one kind of abrasive-resistant particles dispersed in the metal, said composite layer being formed on said metallic plating layer by electroless plating.

4. A method as claimed in claim 3, wherein the metallic plating layer comprises nickel, and the composite abrasive-resistant plating layer comprises a nickel substrate and abrasive-resistant particles consisting essentially of silicon carbide dispersed therein.

5. A method of reclaiming a die for extruding a ceramic honeycomb structural body from a ceramic batch of raw materials, wherein said die comprises latticelike slits of a desired width for defining a thickness of cell walls of the honeycomb structural body, a plurality of independent inlet holes in communication with the slits for introducing said batch into said slits from a supply of said batch, a composite plating film of a double layered structure consisting essentially of a composite abrasive resistant plating layer and a metallic plating layer, said film being arranged on at least the surface of said slits for defining a desired slit width, said metallic plating layer being formed by electroless plating of a metal on at least the surface of said slits, said composite abrasive-resistant plating layer comprising at least one metal and at least one kind of abrasive-resistant particles dispersed in the metal and being arranged on said metallic plating layer, said method comprising the steps of, dissolving and removing a remaining portion of said double layered structure chemically and replating said composite plating layer of the double layered structure on at least the surface of said slits to form the desired width of the slits, wherein said reclaiming method is initiated when the composite abrasiveresistant plating layer of the slits becomes worn by an abrasive action of said batch to such an extent that a tolerable range of the desired width of the slits has been surpassed.

* * * * *